R. L. GUTHRIE.
CULTIVATOR.
APPLICATION FILED NOV. 29, 1919.

1,342,285.

Patented June 1, 1920
3 SHEETS—SHEET 1.

WITNESSES

INVENTOR
ROBERT L. GUTHRIE.
BY
ATTORNEYS

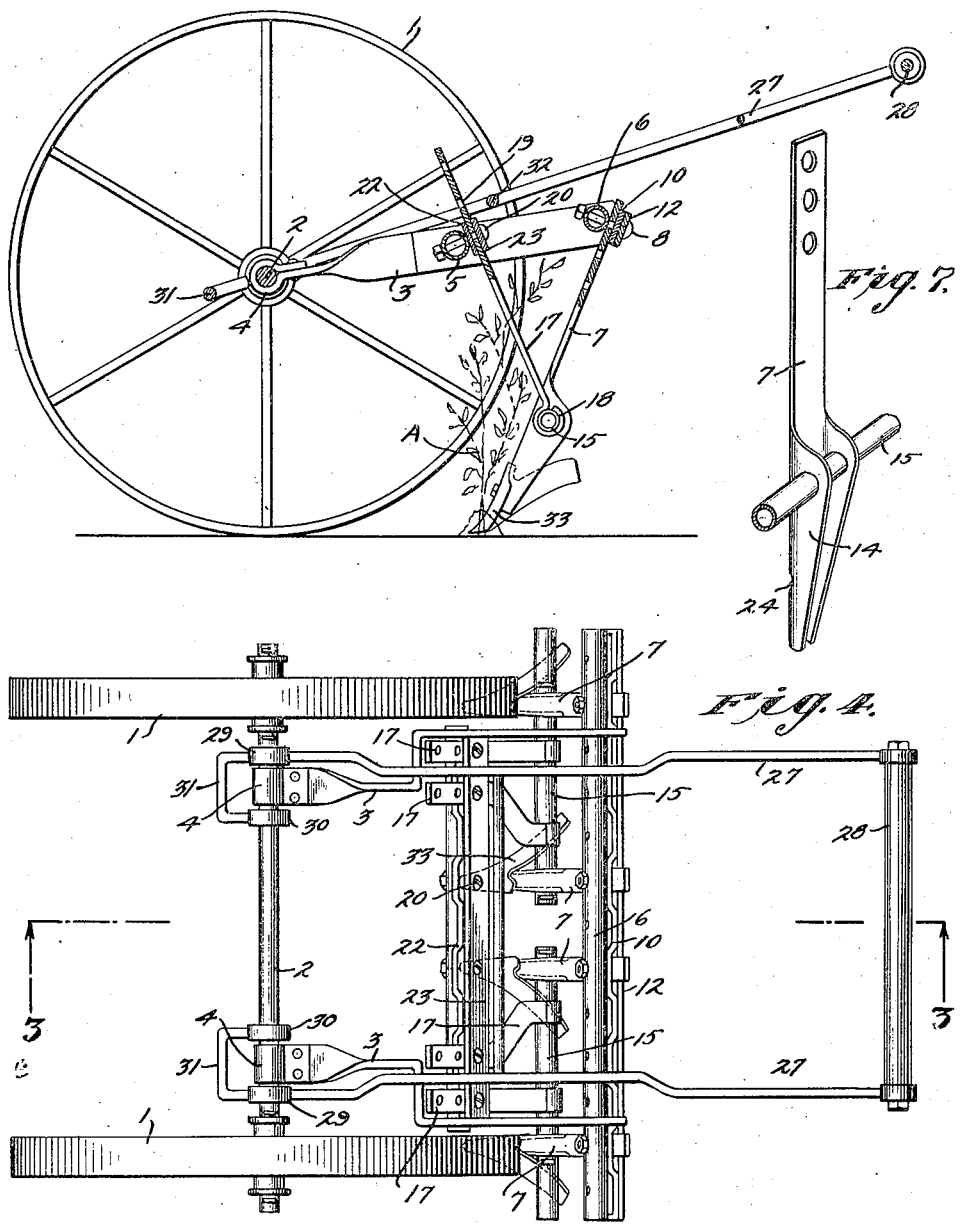

R. L. GUTHRIE.
CULTIVATOR.
APPLICATION FILED NOV. 29, 1919.
1,342,285.
Patented June 1, 1920.
3 SHEETS—SHEET 3.
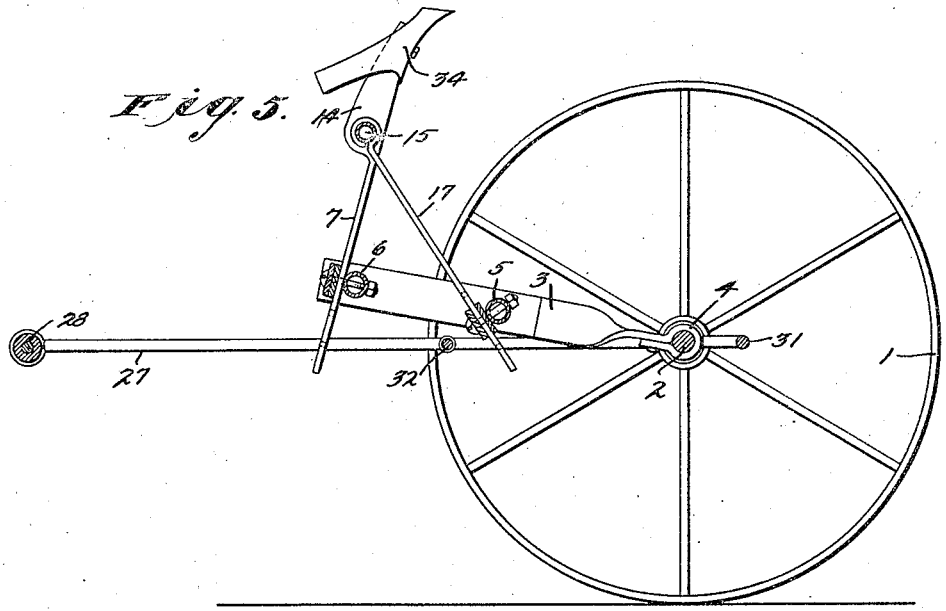
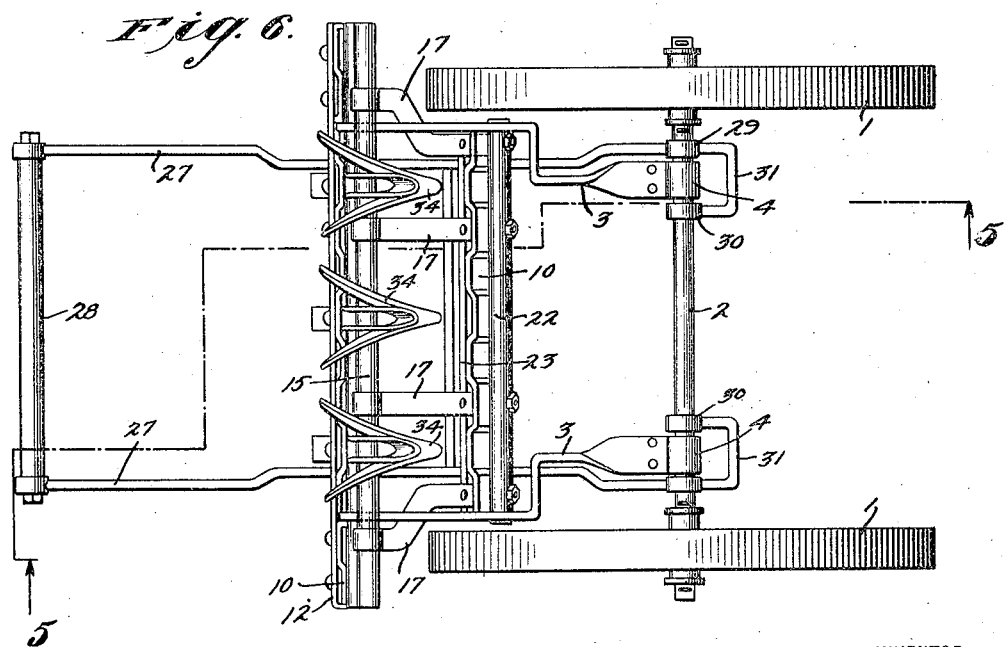
WITNESSES
INVENTOR
ROBERT L. GUTHRIE.
BY
ATTORNEYS

UNITED STATES PATENT OFFICE.

ROBERT LEE GUTHRIE, OF SANTA ROSA, CALIFORNIA.

CULTIVATOR.

1,342,285.  Specification of Letters Patent.  Patented June 1, 1920.

Application filed November 29, 1919. Serial No. 341,353.

*To all whom it may concern:*

Be it known that I, ROBERT L. GUTHRIE, a citizen of the United States, and a resident of Santa Rosa, in the county of Sonoma and State of California, have invented a new and Improved Cultivator, of which the following is a full, clear, and exact description.

This invention relates to improvements in cultivators, and more particularly to hand-operated cultivators of the wheeled type, an object of the invention being to provide a cultivator which will be capable of a wide range of adjustment to accommodate the device for various uses and which is relatively light so as to be easily moved over the ground.

A further object is to provide an improved mounting and arrangement of plow standards and braces therefor which permit of a wide range of adjustment of the angle of the standards and adjustment of the number and arrangement of standards and plows or attachments thereto to perform the functions desired.

A further object is to provide a cultivator which may be utilized either as a pulling or pushing device and which permits the plow standards and adjacent parts to be swung up out of the way and supported on the handle so that the device can be conveniently moved from place to place.

With these and other objects in view the invention consists in certain novel features of construction, and combinations and arrangements of parts, as will be more fully hereinafter described and pointed out in the claims.

In the accompanying drawings—

Fig. 3 is a view in section on the line 3—3 of Fig. 4, showing the cultivator in position for pushing and also showing a modified arrangement of parts;

Fig. 4 is a plan view of Fig. 3;

Fig. 5 is a view in section on the line 5—5 of Fig. 6 showing the parts in position for movement from place to place;

Fig. 6 is a plan view of Fig. 5; and

Fig. 7 is a perspective view of one of the plow standards.

Figure 1:
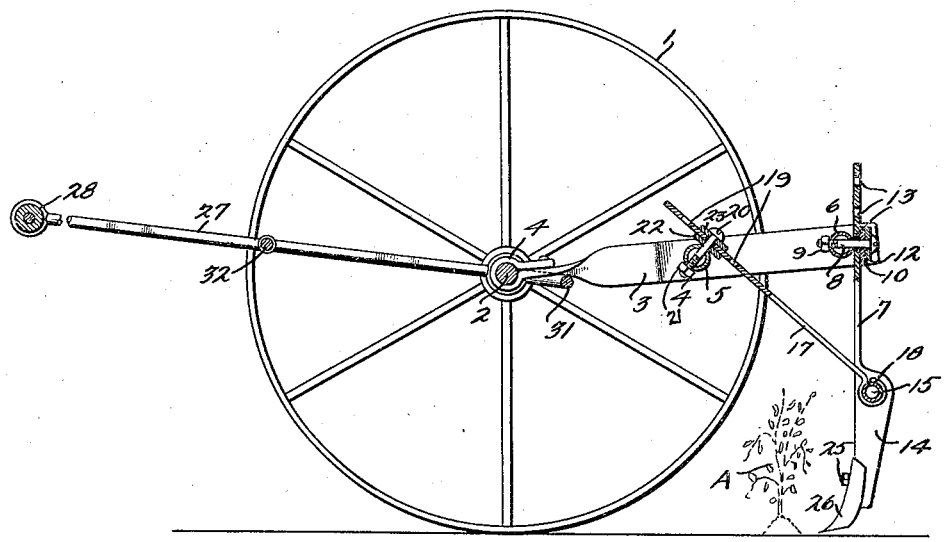
Figure 1 is a view in longitudinal section on the line 1—1 of Fig. 2, illustrating the position of parts when the device is to be pulled over the ground.

1, 1, represent a pair of wheels preferably of relatively large diameter but light in weight. These wheels 1, 1, support an axle 2, and a pair of bracket arms 3, 3, have their forward ends bent forming sleeves 4 receiving the axle 2 and hence pivotally mounted on the axle. The bracket arms 3, 3, support a pair of parallel rods 5 and 6. These rods may be tubular in form and have a turning or rotary mounting in the bracket arms. The rear rod 6 constitutes a support for a series of plow standards 7, which are secured to the rod by bolts 8 and nuts 9. A bar 10, which is bent or offset at different points to form pockets 10$^a$, is located against the rod 6 and at its offset portions extends across and receives the standards 7, and a straight covering strip 12 is located against the outer face of the bar 10, and the bolts 8, above referred to, extend through the bar 10 and the strip 12 as well as through the standards 7 and effectually secure the parts together.

The standards 7 have a longitudinal series of openings 13 to receive the bolts 8 in any of said openings and permit of longitudinal adjustment of the standards, as will more fully hereinafter appear. The standards 7 at their lower ends are made with integral perforated webs 14 which support a connecting rod 15. Braces 17, having grooves 18 at their rear ends receiving the rod 15, are secured at their forward ends to the rod 5. These braces 17 have a longitudinal series of openings 19 adapted to receive in any of them a bolt 20 projected through the rod 5 and secured in place by a nut 21. A bar 22, corresponding to the bar 10, and a covering strip 23, corresponding to the strip 12, are employed adjacent the rod 5 to assist in coupling the braces 17 thereto.

To the standards 7 any desired form of plow 26 may be secured by means of bolts 25, and it is to be understood that these plows will be changed in accordance with the work to be done, and certain of said modified forms of plow will be more fully hereinafter referred to.

A pair of handle bars 27 are employed and are connected at their forward ends by a rubber covered handle 28. The rear ends of the bars 27 are connected to the axle 2 by means of collars 29 and 30. In other words, each bar is fixed to a collar 29 and the collars 29 and 30 are connected by a U-shaped extension 31 which constitutes a portion of the bar and which extends normally under the bracket arm 3, as shown clearly in Figs. 1 and 2, so that by imparting a pivotal movement to the handle, the plows can be raised and lowered and given the desired elevation. The handle bars 27 are preferably strengthened by a transverse brace rod 32 connecting them.

Figure 2:
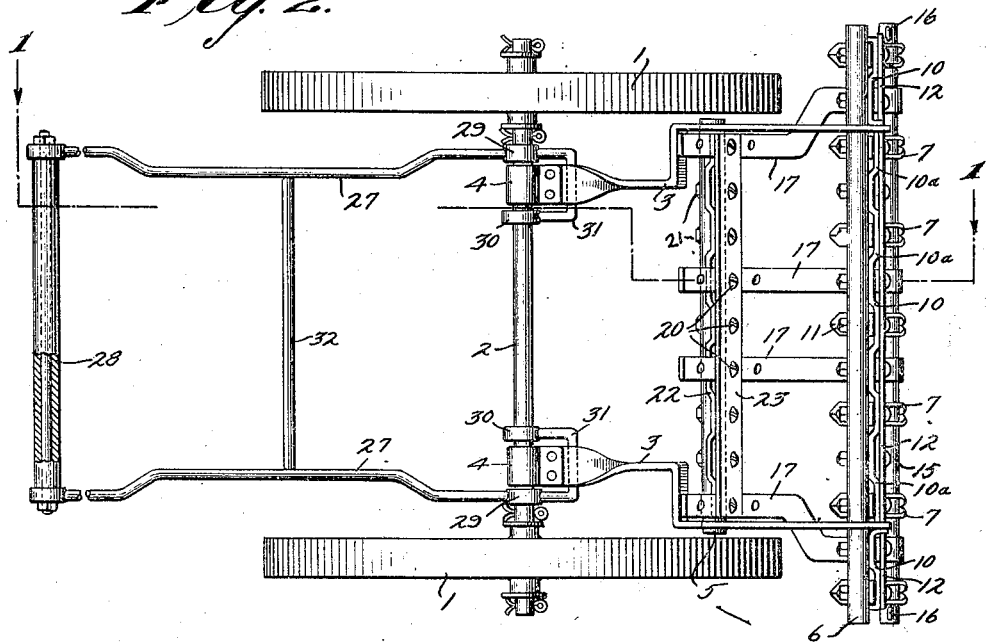
Fig. 2 is a plan view of Fig. 1.

As above stated, Figs. 1 and 2 illustrate the arrangement of parts when the device is to be pulled over the ground. When the device is to be pushed over the ground, the handle is swung to the rear to the position shown in Fig. 3, and I have illustrated in this connection a modified form of plow 33 which may constitute what is known in the trade as a "half sweep" which is designed to throw the soil away from the plant. To properly position this form of attachment the standard 7 is adjusted so that its uppermost opening 13 receives the bolt 8, and the brace 17 is adjusted relative to the rod 5 so that its lowermost opening 19 receives the bolt 20. This arrangement of standard and brace, with the rods 5 and 6 capable of turning movement, enables any desired disposition of the standard to be made and rigidly supports the standard in any position of adjustment.

In this form of my invention I utilize rods 15 of short sections so that spaces are provided between the standards for the passage of the plants illustrated by the reference letter A. In Fig. 1, for example, the low plants A can pass under the rod 15, but when the plants have grown, it is necessary to provide spaces between the standards for the passage of the plants, and to do this the rods 15 are utilized in sections.

Furthermore, it will be noted that certain of the braces 17 are straight and others are angular or bent in order to best engage the rods, and the angular braces at the ends can be reversed in position, as shown in Figs. 2 and 4 respectively, so that a wide range of adjustment is had to suit conditions.

When the device is to be moved from place to place, the bracket arms 3 with all parts connected thereto are swung forwardly onto the handle bars, as shown in Figs. 5 and 6, and are conveniently supported for transportation. In these Figs. 5 and 6, I have illustrated double sweeps 34 on the standards and, as above stated, I may utilize any desired form of plow or sweep, or other attachment, on the cultivator and do not limit myself to the particular shapes illustrated.

It will thus be noted that my improved cultivator is capable of a wide range of adjustment and modification of attachment to enable various forms of cultivation, and that the device can be either pushed or pulled, and, of course, could be made for the attachment of a draft animal, if desired. The device is relatively light so as to reduce labor to a minimum and can be conveniently transported from place to place for use.

Various slight changes may be made in the general form and arrangement of parts described without departing from the invention, and hence I do not limit myself to the precise details set forth but consider myself at liberty to make such changes and alterations as fairly fall within the spirit and scope of the appended claims.

I claim:

1. A cultivator, comprising a pair of wheels, an axle supported thereby, a pair of bracket arms pivotally connected to the axle, a pair of rods supported by the bracket arms, plow standards secured to one of said rods, connecting devices between the plow standards, and braces connected to said connecting devices and adjustably secured to the other of said rods.

2. A cultivator, comprising a pair of wheels, an axle supported thereby, a pair of bracket arms pivotally connected to the axle, a pair of rods mounted to turn in the arms, standards having a series of openings therein, securing devices adapted to connect the standards through any of said openings with one of said rods, and braces connected at one end to the standards and at their other ends having a series of openings adapted to receive the securing means on the other of said rods.

3. A cultivator, comprising a pair of wheels, an axle supported by the wheels, bracket arms pivotally connected to the axle, a pair of rods supported by the bracket arms, plow standards secured to one of said rods, braces connecting the standards with the other of said rods, a handle pivotally supported on the axle, and an extension on the handle normally positioned under the said bracket arms.

4. A cultivator, comprising a pair of wheels, an axle supported thereby, a pair of bracket arms pivotally connected to the axle, a pair of rods supported by the bracket arms, plow standards secured to one of said rods, connecting devices between the plow standards, braces connected to said connecting devices and adjustably secured to the other of said rods, a handle pivotally supported on the axle, and an extension on the handle normally positioned under the said bracket arms.

5. A cultivator, comprising a pair of wheels, an axle supported thereby, a pair of bracket arms pivotally connected to the axle, a pair of rods mounted to turn in the arms, standards having a series of openings therein, securing devices adapted to connect the standards through any of said openings with one of said rods, braces connected at one end to the standards and at their other ends having a series of openings adapted to receive the securing means on the other of said rods, a handle pivotally supported on the axle, and an extension on the handle normally positioned under the said bracket arms.

6. A cultivator, comprising a pair of wheels, an axle supported by the wheels, a pair of bracket arms pivotally supported on the axle, a pair of rods carried by the bracket arms, a series of plow standards, recessed bars engaging the standards and positioned against one of said rods, covering strips against the recessed bars, bolts projected through the covering strip, recessed bars, standards and one of said rods, securing the parts together, connecting rods supported by the standards, and braces connecting the connecting rods with the other of said rods supported by the bracket arm.

7. A cultivator, comprising a pair of wheels, an axle supported by the wheels, a pair of bracket arms pivotally supported on the axle, a pair of rods carried by the bracket arms, a series of plow standards, recessed bars engaging the standards and positioned against one of said rods, covering strips against the recessed bars, bolts projected through the covering strip, recessed bars, standards and one of said rods, securing the parts together, connecting rods supported by the standards, braces connected to said connecting rods, and means adjustably connecting the braces to the other of said rods carried by the bracket arm.

8. A cultivator, comprising a pair of wheels, an axle supported by the wheels, a pair of bracket arms pivotally connected to the axle, a pair of parallel rods having rotary mounting in said arms, plow standards adjustably connected to one of said rods, braces adjustably connected to the other of said rods, devices connecting the braces and the standards, and plows removably secured to said standards.

9. A cultivator, comprising a pair of wheels, an axle supported by the wheels, a handle pivotally connected to the axle, a pair of bracket arms pivotally connected to the axle, plow standards adjustably connected to the bracket arms, and said bracket arms adapted to be swung into supporting position on the handle.

ROBERT LEE GUTHRIE.